(12) United States Patent
Douarre et al.

(10) Patent No.: US 10,254,435 B2
(45) Date of Patent: Apr. 9, 2019

(54) POWER GENERATION FOR MOBILE INSPECTION SYSTEM

(71) Applicant: Smiths Heimann SAS, Vitry sur Seine (FR)

(72) Inventors: Guillaume Douarre, Vitry sur Siene (FR); Steve Parneix, Vitry sur Siene (FR)

(*) Notice: Subject to any disclaimer, the term of this patent is extended or adjusted under 35 U.S.C. 154(b) by 121 days.

(21) Appl. No.: 14/905,934

(22) PCT Filed: Jul. 16, 2014

(86) PCT No.: PCT/GB2014/052176
§ 371 (c)(1),
(2) Date: Jan. 18, 2016

(87) PCT Pub. No.: WO2015/008068
PCT Pub. Date: Jan. 22, 2015

(65) Prior Publication Data
US 2016/0154137 A1    Jun. 2, 2016

(30) Foreign Application Priority Data
Jul. 18, 2013 (GB) .................................. 1312876.4

(51) Int. Cl.
*G01V 5/00* (2006.01)
(52) U.S. Cl.
CPC .......... *G01V 5/0016* (2013.01); *G01V 5/0066* (2013.01)
(58) Field of Classification Search
CPC .................. G01V 5/0016; G01V 5/0066
See application file for complete search history.

(56) References Cited

U.S. PATENT DOCUMENTS

| 6,763,635 | B1 | 7/2004 | Lowman |
| 2001/0021241 | A1 | 9/2001 | Swift et al. |
| 2004/0011714 | A1* | 1/2004 | Wilkendorf ........ B01D 35/0276 210/136 |

(Continued)

FOREIGN PATENT DOCUMENTS

WO    2006036076 A1    4/2006

OTHER PUBLICATIONS

GB Official Action dated Dec. 18, 2013 for Application No. GB1312876.4.

(Continued)

*Primary Examiner* — Chih-Cheng Kao
(74) *Attorney, Agent, or Firm* — Kevin E. West; Advent, LLP

(57) ABSTRACT

In one aspect, the disclosure relates to a mobile inspection system (1) comprising: an inspection module (3) mounted on a chassis (10) of the system and comprising an inspection radiation source (31) and an inspection radiation detector (32); wherein the system (1) is configured to operate at least in: a transport mode wherein the system is configured to transport the inspection module (3); and an inspection mode wherein the inspection module (3) is configured to cause scan of an item (100); and a motion generation module (2) adapted to be connected to an engine (21) configured to cause motion of the system (1) at least in the transport mode; wherein the motion generation module (2) is further adapted to cause supply of energy at least to the inspection module (3), in the inspection mode.

14 Claims, 9 Drawing Sheets

(56) References Cited

U.S. PATENT DOCUMENTS

| | | | | |
|---|---|---|---|---|
| 2008/0089469 A1* | 4/2008 | Chen | ............... | G01V 5/0016 378/21 |
| 2008/0123809 A1* | 5/2008 | Tudor | ............... | G01V 5/0016 378/57 |
| 2012/0123619 A1* | 5/2012 | Chen | ............... | B60L 3/0046 701/22 |
| 2012/0132814 A1* | 5/2012 | Weinberg | ............... | G01V 5/0075 250/362 |

OTHER PUBLICATIONS

International Search Report and Written Opinion dated Oct. 24, 2014 for International Application No. PCT/GB2014/052176.

\* cited by examiner

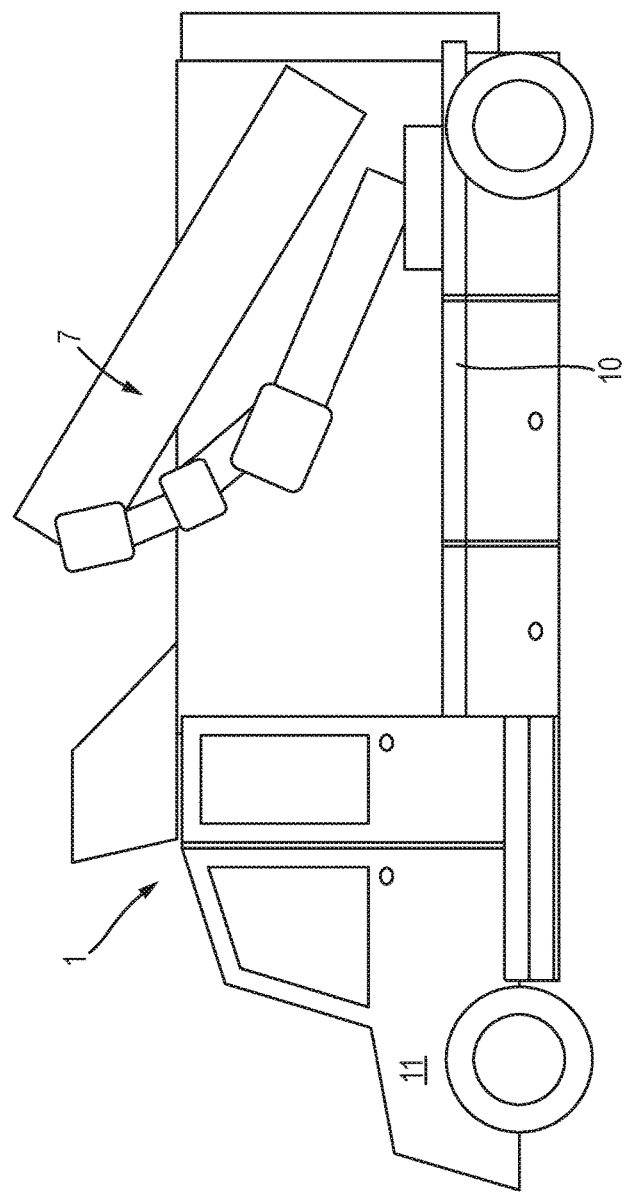

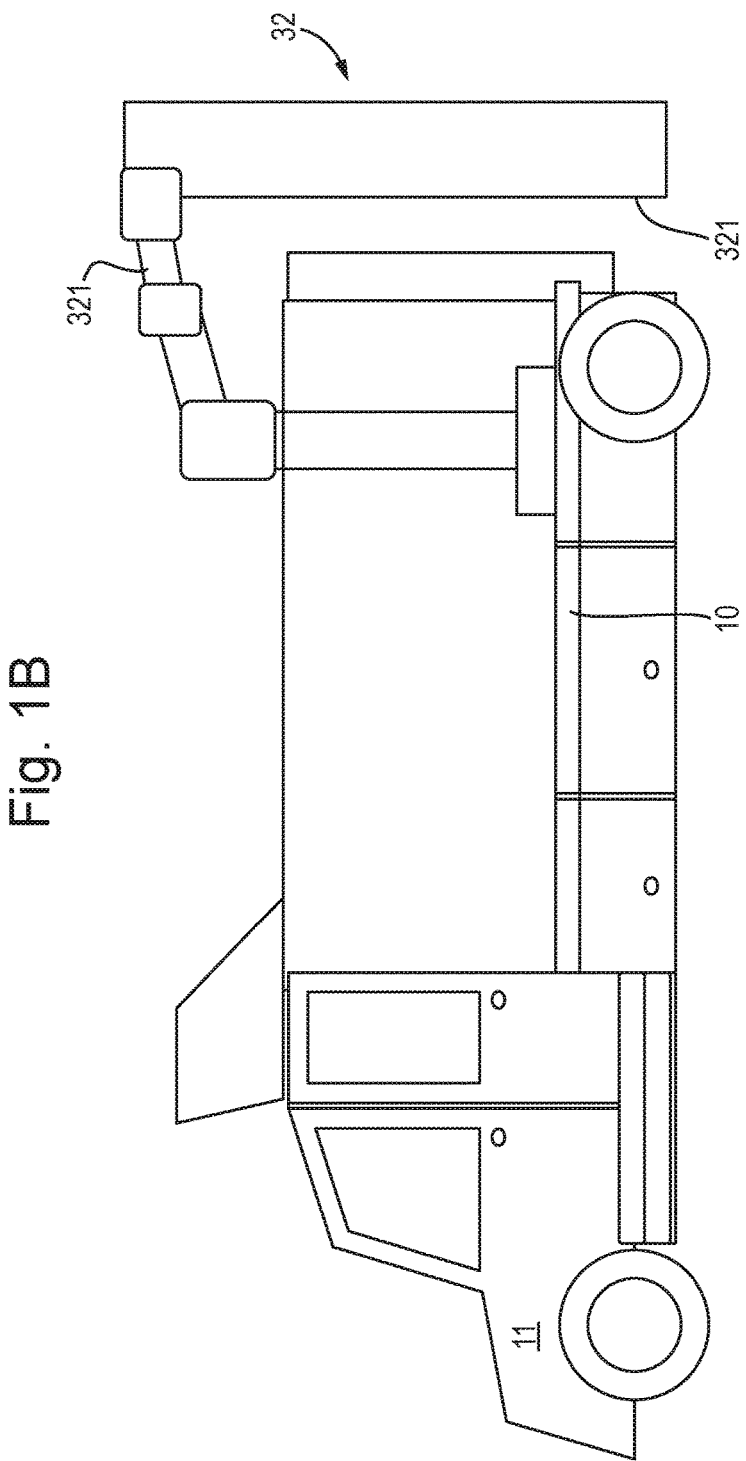

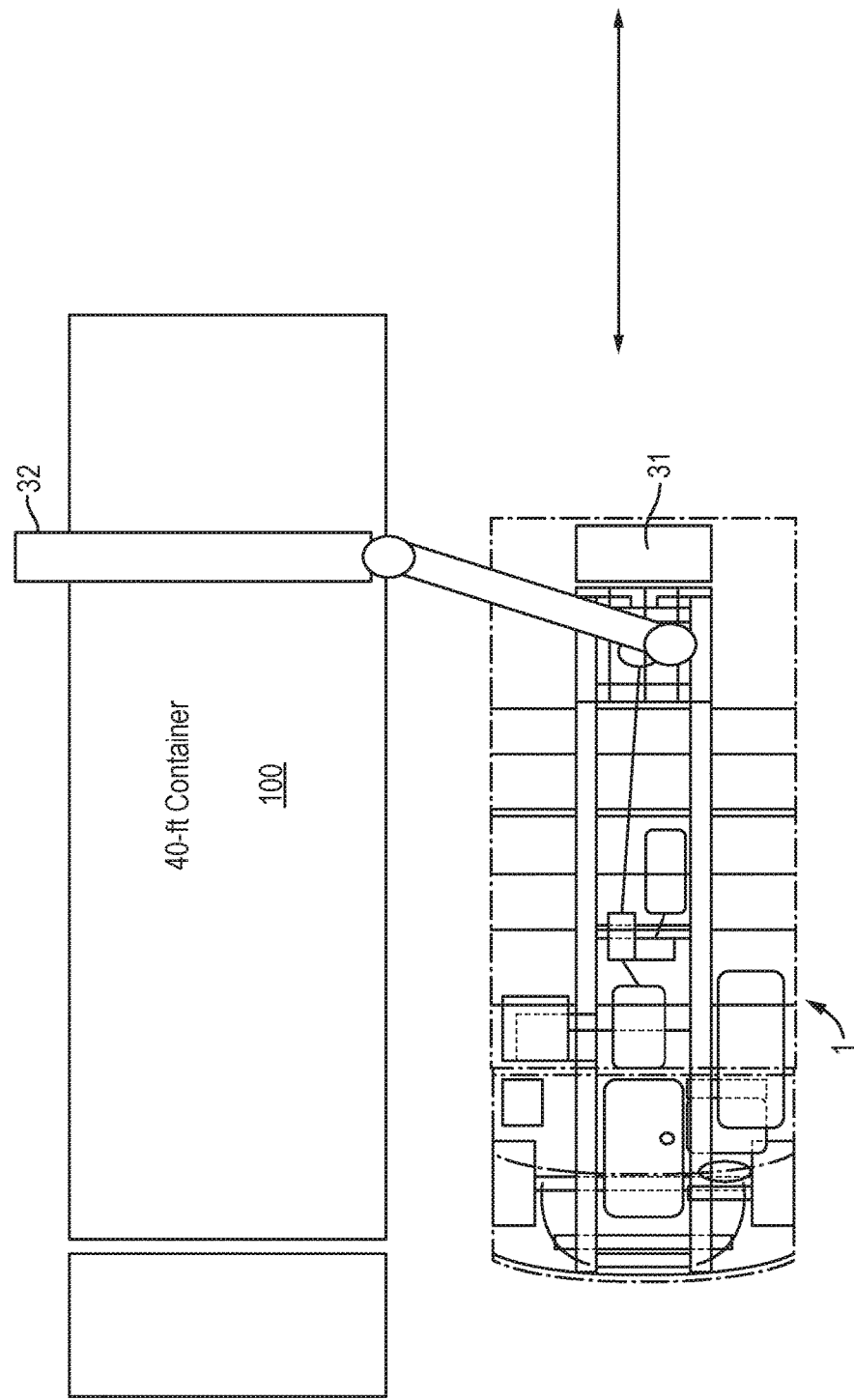

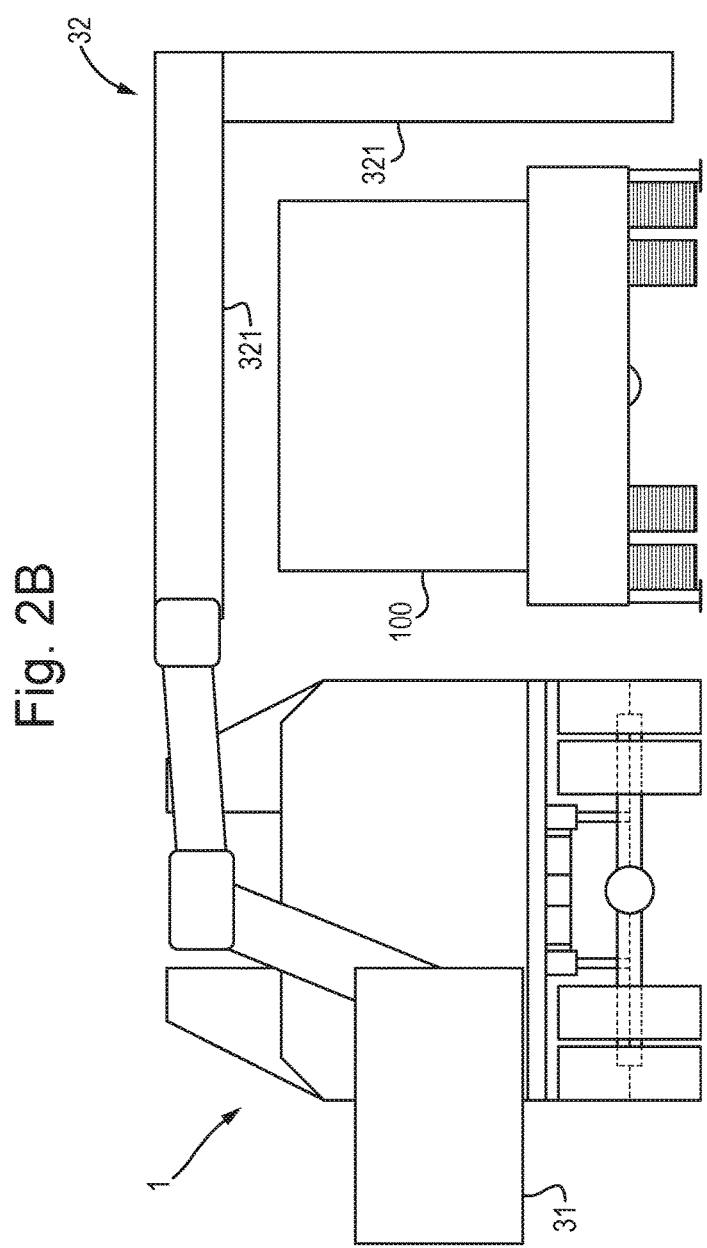

POWER GENERATION FOR MOBILE INSPECTION SYSTEM

The present disclosure relates to power generation devices, and more particularly to power generation devices for mobile inspection systems.

Mobile systems for radiation inspection of vehicle and/or container cargo are moved, in a transport mode, using power from a dedicated engine (e.g., a conventional diesel-fuelled internal combustion engine). It is desirable to keep the weight of the mobile inspection system as low as possible, whilst at the same time integrating as many elements as possible in the system.

In an aspect, it is provided a mobile inspection system comprising:
- an inspection module mounted on a chassis of the system and comprising an inspection radiation source and an inspection radiation detector;
- wherein the system is configured to operate at least in:
  - a transport mode wherein the system is configured to transport the inspection module; and
  - an inspection mode wherein the inspection module is configured to cause scan of an item; and
- a motion generation module adapted to be connected to an engine configured to cause motion of the system at least in the transport mode;
- wherein the motion generation module is further adapted to cause supply of energy at least to the inspection module, in the inspection mode.

The system may further comprise a power conversion module configured to cause conversion of energy from the engine into electrical energy for at least the inspection module, in the inspection mode. The inspection radiation detector may be adapted to be activated by a power supply adapted to be connected, in the inspection mode, to the conversion module. The inspection radiation source may comprise an X-ray generator adapted to be activated by a power supply adapted to be connected, in the inspection mode, to the conversion module.

The motion generation module may further comprise a transfer case adapted to be connected to the engine and configured to switch between a transport mode when the system is in the transport mode and an inspection mode when the system is in the inspection mode. The transfer case may further be configured to cause, in the scan mode, the power conversion module to cause conversion of energy from the engine into electrical energy for at least the inspection module.

The system may further comprise a regulation module configured to regulate the conversion module to a set point. The power conversion module may comprise a mechanical transmission and/or a hydraulic transmission, for connecting the engine to an electric generator. The hydraulic transmission may comprise a hydraulic pump and a hydraulic motor. The hydraulic pump may be a variable displacement pump. The regulation module may be configured to control the displacement of the pump, such that a speed of the motor is regulated to a set point.

The inspection mode may comprise a scan mode wherein the system is configured to move, with a scanning motion, with respect to the item to be scanned.

The motion generation module may be adapted to be connected to the engine configured to further cause motion of the system in the scan mode.

The motion generation module may further comprise a mechanical drive transmission adapted to be connected to the engine and a driven axle of the system and a reduction drive transmission. The motion generation module may be configured to drive the driven axle through the mechanical drive transmission in the transport mode, and further through the reduction drive transmission in the scan mode.

The system may further comprise a regulation module configured to regulate the speed of the system to a speed set point, in the scan mode, preferably a scanning speed. The reduction drive transmission may comprise a hydraulic drive transmission comprising a hydraulic pump and a hydraulic motor. The hydraulic pump may be a variable displacement pump. The regulation module may be adapted to control the displacement of the pump, such that a speed of the motor is regulated to a set point.

The system may comprise a safety brake configured to stop a hydraulic transmission in case of hydraulic power loss in the hydraulic transmission.

The inspection radiation detector may comprise an electro-hydraulic boom. The system may further comprise a conditioning circuit which is common to the electro-hydraulic boom and at least one hydraulic transmission. The system may further comprise a conditioning circuit common to the hydraulic transmissions.

The motion generation module may further be adapted to cause supply of energy to any electrical device of the system, in the inspection mode. The system may not comprise any additional power generator which is not adapted to be connected to the engine.

The inspection module and the motion generation module may be mounted on the chassis of a trailer. The engine may be mounted on a tractor.

In another aspect, it is provided an inspection vehicle comprising:
- a tractor comprising an engine configured to cause motion of a trailer of the vehicle in a transport mode, and
- an inspection module mounted on a chassis of the trailer, and comprising an X-ray generator and an inspection radiation detector, the X-ray generator and the detector being adapted to be activated by a power supply adapted to be connected to a power conversion module configured to cause conversion of energy from the engine into electrical energy, in an inspection mode of the inspection module wherein the inspection module is configured to cause scan of an item;
- wherein the trailer is further configured to transport the inspection module, in a transport mode.

The inspection mode may comprise a scan mode wherein the trailer is configured to move, with a scanning motion, with respect to the item to be scanned, in the scan mode.

The engine may further be configured to cause motion of the trailer of the vehicle in the scan mode.

The engine may comprise an internal combustion engine and/or an electrical engine and/or an engine based on a compressed air engine.

The total weight of the vehicle, in the transport mode, may be less than 20 tons, e.g., less than 12 tons, preferably less than 11.8 tons.

The inspection mode may further comprise a pass-through mode, wherein the system or the trailer is configured to be static and wherein the item to be scanned is configured to move, in the pass-through mode, with respect to the system or the trailer.

The inspection module may be configured to, in the inspection mode, cause scan of the item, in totality or partially.

The inspection module may comprise at least one X-ray detector, and optionally at least one gamma detector and/or at least one neutrons detector.

Embodiments of the disclosure will now be described, by way of example only, with reference to the accompanying drawings, in which:

FIGS. 1A and 1B are side elevation views that illustrate an example system in accordance with the present disclosure, respectively in a transport mode and in an inspection mode;

FIG. 2A is a top view that illustrates an example system in accordance with the present disclosure in an inspection mode wherein the system scans an item;

FIG. 2B is a rear view that illustrates an example system in accordance with the present disclosure in an inspection mode wherein the system scans an item;

In the Figures like reference numerals are used to indicate like elements.

Figure 3A:
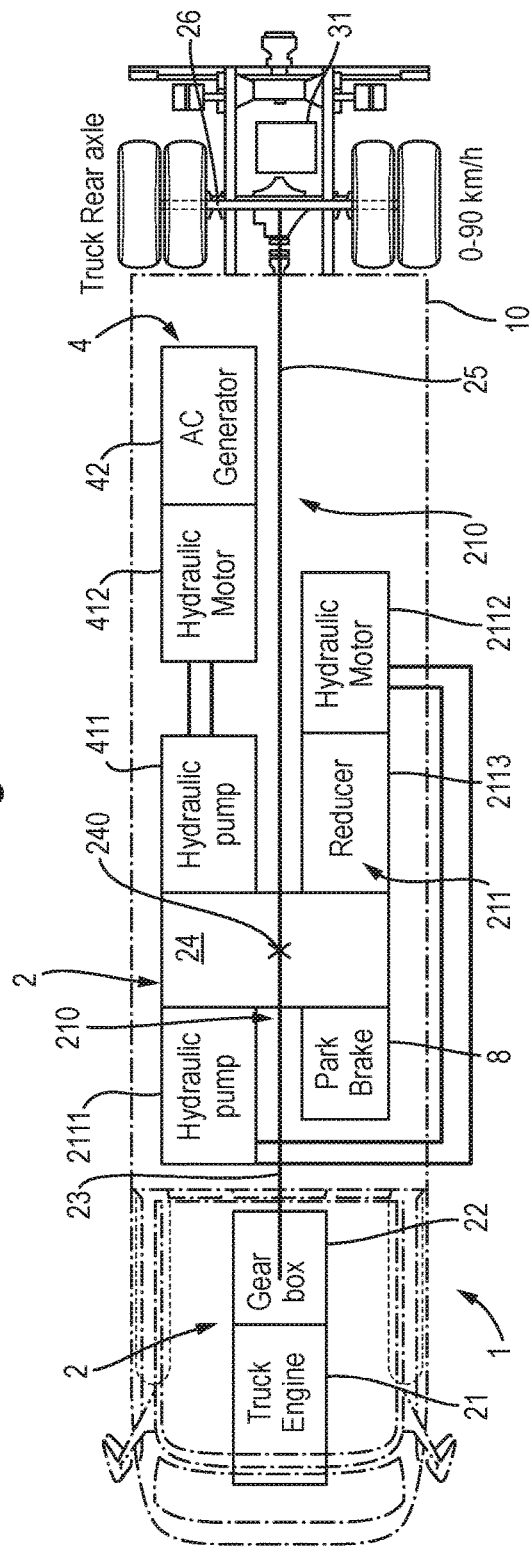
FIGS. 3A and 3B are diagrammatic views that illustrate an example system in accordance with the present disclosure, respectively in a transport mode and in an inspection mode.

Embodiments of the disclosure relate to a mobile inspection system which can be moved using energy from an engine, both in a transport mode and in a scan mode of an inspection mode, and in which the engine is also used to provide energy to the inspection system in the inspection mode. This may enable less energy to be used for operation of the system, e.g. in the inspection mode. This may also enable optimization of the energy used by the system, e.g. in the inspection mode, which is particularly advantageous in the case where it is desirable to keep the energy consumption of the system low. In the case where the engine is e.g., diesel-fuelled, embodiments of the disclosure may thus enable reduction of the fuel consumption of the system, and therefore reduction of the emission of greenhouse effect exhausts. In the case where the inspection system comprises e.g., an X-ray source, embodiments of the disclosure may enable reduction of the emission of X-rays, and thus of the footprint of the system. Embodiments of the disclosure are thus environmentally friendly. Embodiments of the disclosure may enable the engine to cause supply of energy to any electrical device of the system, in the inspection mode. Thus the system may not comprise any additional power generator which is not adapted to be connected to the engine, which is particularly advantageous in the case where it is desirable to keep the weight of the system low. This may also enable design of more compact and cheaper systems.

The Figures illustrate a mobile inspection system 1 comprising an inspection module 3 mounted on a chassis 10 of the system. The system 1 is configured to operate at least in a transport mode, wherein the system is configured to transport the inspection module 3, and an inspection mode wherein the inspection module 3 is configured to cause scan of an item 100.

FIGS. 2A and 2B illustrate that the item 100 may be a vehicle such as a truck, but the item 100 may also be a van, a car and/or a container. The inspection module 3 is configured to cause scan through the material (usually steel) of walls of the item 100, in order to enable inspection of the cargo of the item 100, for inspecting for threats such as explosives, narcotics, weapons of mass destruction (WMDs) and/or contraband.

The inspection module 3 is configured to, in the inspection mode, cause scan of the item 100, in totality (i.e. the whole item 100 is scanned) or partially (i.e. only a chosen part of the item is scanned, e.g., typically, when scanning a vehicle, a cabin of the vehicle may not be scanned, whereas a rear part of the vehicle is scanned).

To that effect, the inspection module 3 mainly comprises an inspection radiation source 31 and an inspection radiation detector 32.

In the examples illustrated by the Figures, the inspection radiation source 31 comprises an X-ray generator adapted to be activated by a power supply 42 (e.g., a generator) adapted to be connected to a conversion module 4 described in more detail below. The power of the X-ray source 31 may be e.g., between 500 keV and 9.0 MeV, typically e.g., 4 MeV, for a steel penetration capacity e.g., between 30 mm to 400 mm, typically e.g., 200 mm (7.9 in).

In the examples illustrated by the Figures, the inspection radiation detector 32 is adapted to be activated by the power supply 42, in the inspection mode, and comprises, amongst other conventional electrical elements, radiation detection lines 321, such as X-ray detection lines. The inspection radiation detector 32 may further comprise other types of detectors, such as optional gamma or neutrons detectors, e.g., adapted to detect the presence of radioactive gamma and/or neutrons emitting materials within the item 100, e.g., simultaneously to the X-ray inspection. The inspection radiation detector 32 also preferably comprises an electro-hydraulic boom 7 which can operate in a retracted position in the transport mode (FIG. 1A) and in an inspection position (FIG. 1B). The detection lines 321 are mounted on the boom 7, facing the source 31 on the other side of the item 100 in the scan position of the boom 7. The boom 7 is operated by hydraulic activators (such as hydraulic cylinders).

The system also comprises a motion generation module 2 adapted to be connected to an engine 21 configured to cause motion of the system 1 at least in the transport mode.

The inspection mode comprises a scan mode wherein the system is configured to move, with a scanning motion, with respect to the item 100 to be scanned. In the scan mode, the item is static with respect e.g., to the ground, and the system moves with respect to the ground. Advantageously, the motion generation module 2 is adapted to be connected to the engine 21 configured to cause motion of the system 1 in the scan mode.

As it will be apparent from the Figures and the following description, the system 1 advantageously forms a trailer (i.e. rear part) of a vehicle further comprising a tractor 11 (i.e. front part) comprising the engine 21. In the examples illustrated by the Figures, the trailer 1 forms an integer with the tractor 11 to form the vehicle (i.e. the trailer and the tractor have a common chassis 10, and the trailer 1 is not independent and/or removable from the tractor 11), and comprises a driven axle 26, for example a rear axle, connected to wheels. The engine 21 may comprise an internal combustion engine and/or an electrical engine and/or an engine based on a compressed air engine. In the examples illustrated by the Figures, the motion generation module 2 is also mounted on the chassis 10 of the system 1.

In the examples illustrated by the Figures, the motion generation module 2 further comprises a transfer case 24 adapted to be connected to the engine 21 and configured to switch between a transport mode when the system 1 is in the transport mode and an inspection mode when the system 1 is in the inspection mode. The transfer case 24 is adapted to be connected to the engine 21 via a propeller shaft 23 and a gearbox 22 of the generation module 2. The switch of the transfer case 24 from the transport mode to the inspection mode, and vice versa, is performed, as known by those skilled in the art, e.g., using a shifter or an electronic switch connected to a controller 27 in the tractor 11, and using e.g., a pneumatically controlled jaw clutch of the system 1, e.g. using dogs, controlled by a module 6 on the chassis 10 and described in greater detail below.

The motion generation module 2 may further comprise a mechanical drive transmission 210 and a reduction drive transmission 211. The mechanical drive transmission 210 is adapted to be connected to the engine 21, via the transfer case 24, and to the driven axle 26 of the system 1, via a drive shaft 25, as explained in greater detail below.

The engine 21 and the module 2 are configured to drive the driven axle 26 through the transfer case 24 and the mechanical drive transmission 210 in the transport mode. In the examples illustrated by the FIGS. 3A and 5A, the transfer case 24 comprises a connection 240 adapted to connect the propeller shaft 23 to the drive shaft 25. This enables the system to be transported at speeds in the range e.g., of [0-150] km/h, typically in the range e.g., of [0-90] km/h, in the transport mode.

The engine 21 and the module 2 are configured to drive the driven axle 26 through the transfer case 24, the mechanical drive transmission 210 and the reduction drive transmission 211 in the scan mode. The reduction drive transmission 211 comprises an extension from the transfer case 24 and a reducer 2113 connected to the drive shaft 25 via the transfer case 24. This enables the system to be moved by the engine 21 at scanning speeds in the range e.g., of [0-36] m/min, typically in the range of [12-36] m/min, preferably 24 m/min in the scan mode. The scanning speed is chosen by a user on the controller 27. At the maximum scanning speed, the throughput of items 100 in the scan mode may be in the range e.g., of [0-150] items/hour, typically in the range e.g., of [0-25] items scanned per hour. The high rotation speed of the engine 21 does not enable appropriate slow motion of the driven axle 26, and thus of the system 1, in the scan mode. The reduction drive transmission 211 enables reduction of the high rotation speed of the engine 21 to a reduced rotation speed which enables to drive the driven axle 26 to the appropriate scanning speed.

Figure 3B:
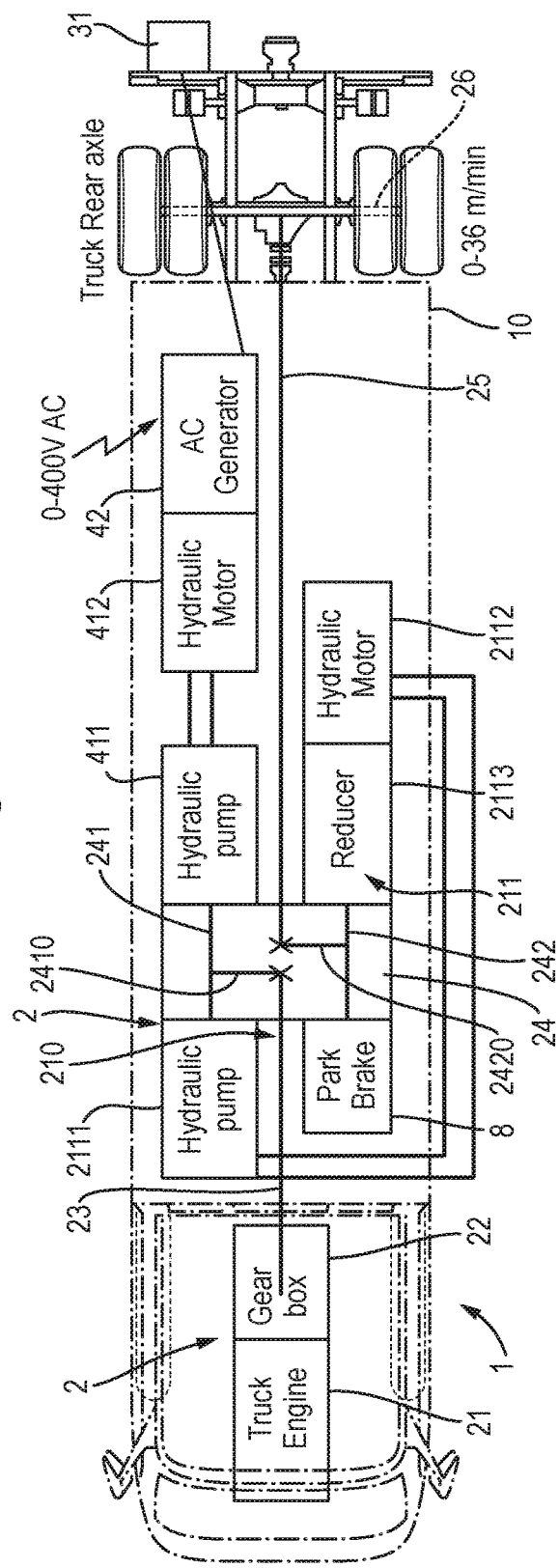
Figure 4:
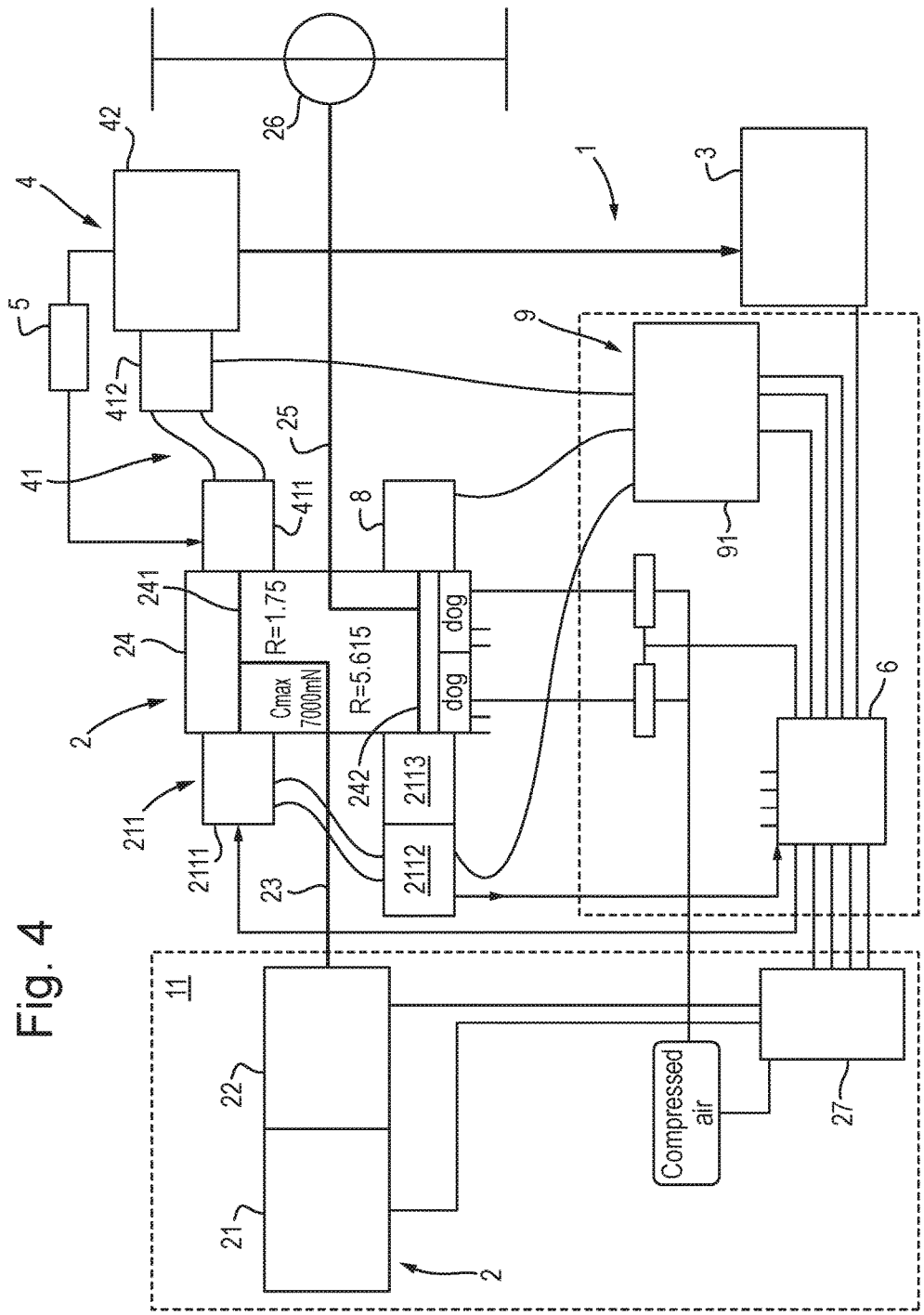
FIG. 4 is a diagrammatic view that illustrates an example system in accordance with the present disclosure.

In the example illustrated by the FIG. 3B, the reduction drive transmission 211 comprises a hydraulic drive transmission comprising a hydraulic pump 2111 and a hydraulic motor 2112 connected to the reducer 2113. In the example illustrated by the FIG. 5B, the reduction drive transmission 211 comprises the electric generator 42 and an electric motor 2114 connected to the reducer 2113.

Figure 5A:
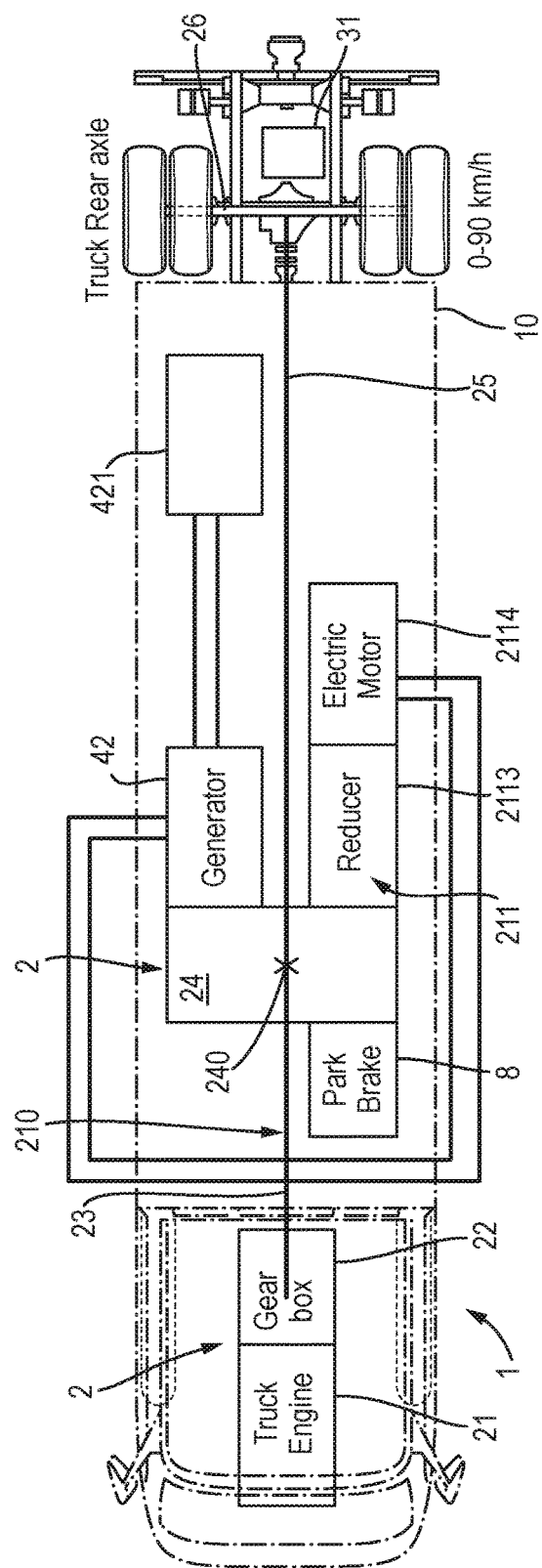
FIGS. 5A and 5B are diagrammatic views that illustrate another example system in accordance with the present disclosure, respectively in a transport mode and in an inspection mode.
Figure 5B:
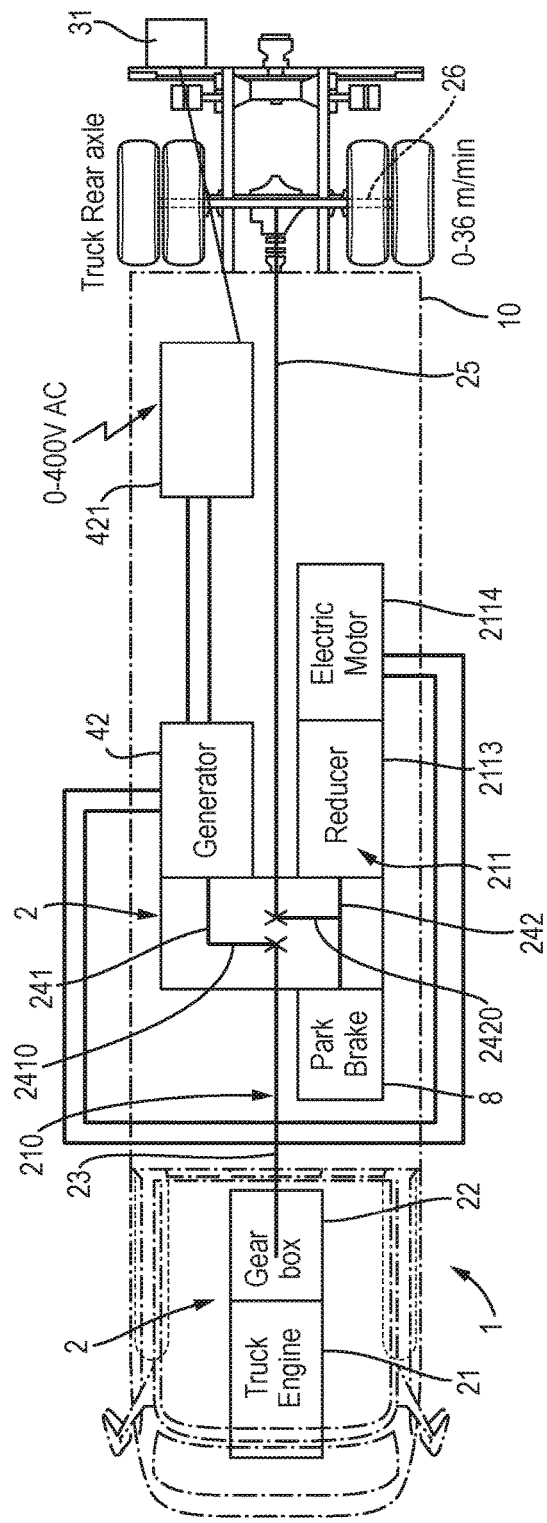

In the examples illustrated by the FIGS. 3B and 5B, the transfer case 24 comprises a connection 2410, adapted to connect the propeller shaft 23 to a shaft 241 connected to the pump 2111 or to the generator 42, respectively. In order to connect the reducer 2113 to the drive shaft 25, the transfer case 24 comprises a connection 2420, adapted to connect a shaft 242 connected to the reducer 2113, to the drive shaft 25.

In the examples illustrated by the Figures, the motion generation module 2 is further adapted to cause supply of energy at least to the inspection module 3, in the inspection mode, e.g., in the scan mode.

To that effect, in the examples illustrated by the Figures, the system 1 further comprises the power conversion module 4, configured to cause conversion of energy from the engine 21 into electrical energy for at least the inspection module 3, in the scan mode.

The power conversion module 4 may be adapted to be connected, in the scan mode, to the electric generator 42, such as an alternative current generator, adapted to convert energy from the engine 21 into electrical energy for at least the inspection module 3. The alternative current generator may be adapted to supply power to the module 3, for example by providing alternative current in the range of [0-400]V, for e.g., between 10-40 kVA, typically e.g., 24 kVA. In the transport mode, the power module 4 is disconnected from the electric generator 42 as explained in greater detail below.

As illustrated by FIGS. 3A, 3B, 5A and 5B, the power conversion module 4 may comprise a mechanical transmission comprising the transfer case 24 for connecting, in the scan mode, the engine 21 to the electric generator 42 (FIGS. 5A and 5B). The power conversion module 4 may further comprise a hydraulic transmission 41 (FIGS. 3A and 3B).

In the example of FIG. 5B, the transfer case 24 comprises the connection 2410 adapted to connect, in the scan mode, the propeller shaft 23 to the shaft 241 connected to the generator 42. In FIG. 5B, the electric generator 42 is thus adapted to supply electrical energy to both the electric motor 2114 connected to the reducer 2113, and the source 31, optionally via an appropriate converter 421.

In the example of FIG. 3B, the hydraulic transmission 41 comprises a hydraulic pump 411 and a hydraulic motor 412. The connection 2410 is adapted to connect, in the scan mode, the propeller shaft 23 to the shaft 241 connected to the pump 411. The pump 411 is in turn connected to the hydraulic motor 412, connected to the generator 42.

The system may further comprise a regulation module 5 configured to regulate the conversion module 4 to a set point. The module 5 preferably comprises a PID (proportional, integral, derivative) loop comprising a speed sensor.

In the example illustrated by the FIG. 3B, the hydraulic transmission 41 is hydrostatic. Preferably the hydraulic pump 411 is a variable displacement pump, and the regulation module 5 is configured to control the displacement of the pump 411, such that a speed of the motor 412 is easily regulated to a set point. The speed of the motor 412 is thus checked by the speed sensor and regulated by the module 5, via the control of the displacement of the pump. The regulated speed of the motor 412 enables regulated generation of electrical energy, including power frequency, by the generator 42 within a desired range required for the source 31. Furthermore, the module 5 also enables easy adaptation of the module 4 and the generator 42 to different types of sources 31. For sources which are configured to operate at 60 Hz (e.g., US market), the speed of the motor 412 is regulated to 1800 rpm, and for sources which are configured to operate at 50 Hz, the speed of the motor 412 is regulated to 1500 rpm.

The system may further comprise a speed regulation module 6 configured to regulate the speed of the system 1 to a speed set point, in the scan mode, preferably a scanning speed. The module 6 preferably comprises a PID loop comprising a speed sensor. In the example illustrated by the FIG. 3B, the hydraulic drive transmission 211 is hydrostatic. Preferably the pump 2111 is a variable displacement pump, and the regulation module 6 is adapted to control the displacement of the pump 2111, such that a speed of the motor 2112 is easily regulated to a set point. The speed of the motor 2112 is checked by the speed sensor and is regulated by the module 6 via the control of the displacement of the pump 2111 in order to guarantee a constant scanning speed, for good image quality.

As discussed above, the hydrostatic hydraulic drive transmission 211 and the hydrostatic hydraulic transmission 41 are adapted to deliver a constant output, either for the scanning speed or for the power frequency, respectively.

For technical design reasons, the source 31 and the generator 42 are at the rear of the chassis 10 of the system. The hydraulic transmission 41 is a convenient way to bring energy from the engine 21 to the generator 42 and/or the source 31. The hydraulic drive transmission 211 is also a compact and convenient way to bring energy from the engine 21 to the reducer 2113.

In the examples illustrated by the Figures, at least one of the hydraulic drive transmission 211 or hydraulic transmission 41 comprises a hydraulic safety brake 8, configured to block rotation of a shaft, e.g., the shaft 242, thus blocking the hydraulic transmission 211 or 41, in case of hydraulic power loss in the hydraulic transmission 211 or 41, e.g., due to hydraulic leak. If the hydraulic transmission 211 or 41 loses power, the brake 8 will prevent the system 1 from going further or the source 31 to emit radiation.

The system 1 comprises a hydraulic conditioning circuit 9, comprising a hydraulic fluid tank 91, filters, air/oil intercooler, etc. to be used in the electro-hydraulic boom 7 or in at least one of the hydraulic drive transmission 211 or hydraulic transmission 41. In order to reduce the weight of the system, and thus that of the vehicle in the transport mode, the conditioning circuit 9 is common to the electro-hydraulic boom 7 and at least one, preferably all, of the hydraulic drive transmission 211 and hydraulic transmission 41. Preferably, the hydraulic conditioning circuit 9 is common at least to the hydraulic transmissions 41 and 211.

In the example of the Figures, in operation, in the transport mode, the power of the engine 21 is directly driven to the rear axle 26, via the connection 240 of the transfer case 24 and the mechanical drive transmission 210. In the scan mode, the power of the engine 21 further goes through the reduction drive transmission 211.

In the example of FIGS. 3A and 3B, in the scan mode the shaft 241 is adapted to drive the two hydrostatic transmissions 211 and 41: one for the reduction drive transmission 211, one for the power conversion module 4.

In the reduction drive transmission 211, kinetic energy from the engine 21 is transformed into hydraulic energy by the hydraulic pump 2111. The hydraulic energy is transferred to the hydraulic motor 2112 which in transforms the hydraulic energy back into kinetic energy and is coupled to the rear axle 26 via the reducer 2113, the transfer case 24 and the drive shaft 25 (in the scan mode).

In the power conversion module 4, kinetic energy from the engine 21 is transformed into hydraulic energy by the hydraulic pump 411. The hydraulic energy is transferred to the hydraulic motor 412 which in transforms the hydraulic energy back into kinetic energy and is coupled to the generator 42 which in turn transforms the kinetic energy into electrical energy (in the scan mode, and optionally in a pass-through mode as described below).

In the example of FIGS. 5A and 5B, in the scan mode the shaft 241 is adapted to drive the generator 42.

In the reduction drive transmission 211, kinetic energy from the engine 21 is transformed into electrical energy by the generator 42. The electrical energy is transferred to the electric motor 2114 which in transforms the electrical energy back into kinetic energy, with the appropriate reduction ratio, and is coupled to the rear axle 26 via the reducer 2113, the transfer case 24 and the drive shaft 25 (in the scan mode).

In the power conversion module 4, kinetic energy from the engine 21 is transformed into electrical energy by the generator 42. The electrical energy is transferred to the source 31, via an optional converter 421 (in the scan mode, and optionally in a pass-through mode as described below).

Further to the scan mode, the inspection mode may further comprise a pass-through mode, wherein the system is configured to be static, e.g., with respect to the ground, and wherein the item 100 to be scanned is configured to move, in the pass-through mode, with respect to the system. In the pass-through mode:

in the example of FIGS. 3A and 3B, e.g., the shaft 241 may be disconnected from the hydraulic pump 2111 in the transfer case 24, e.g. using a disconnection system known from the man skilled in the art, such as a clutch, the shaft 241 still being connected to the hydraulic pump 411, and in the example of FIGS. 5A and 5B, e.g., the generator 42 may be disconnected from the electric motor 2114, e.g. using a disconnection system known from the man skilled in the art, such as a switch, the generator 42 still being connected to the source 31, via the optional converter 421.

Advantageously, the electrical energy produced by the generator 42 is available to any electrical device of the system 1. Advantageously, the system may thus not comprise any additional power generator which is not adapted to be connected to the engine 21, such as an additional diesel-fuelled (heavy) generator set. The examples according to the disclosure thus enable compensating for the trends of the increasing weight of the inspection module 3 (because of the need for new functionalities) and of the tractor 11 (because of new regulations regarding fuel consumption and engine emissions (engines more complex, larger exhausts, inline 6 cylinders . . . )). The total weight of the vehicle, in the transport mode, may thus be less than 20 tons, e.g., less than 12 tons, preferably less than 11.8 tons (26,000 lbs). The vehicle according to the disclosure meets all US Federal Bridge Law regulations, which means that the vehicle may be driven without a specific truck driver license, e.g. in the US. The examples according to the disclosure thus also enable a more compact and cheaper system, because an additional a diesel-fuelled generator takes a lot of space and is expensive.

The fact that the truck engine 21 is also on in the inspection mode (i.e. the scan mode and optionally the pass-through mode) guarantees that the main functions of the truck (e.g. engine cooling, cabin Heating Ventilation Air Conditioning (HVAC), cabin heating system, steering and brake assistance, lamps, sirens, etc.) work properly, i.e. they are in a desired temperature range.

It is understood that the inspection radiation source may comprise sources of other radiation, such as gamma rays or neutrons. The inspection radiation source may also comprise sources which are not adapted to be activated by a power supply, such as radioactive sources, such as using Co60 or Cs137.

The trailer (or rear part) may also form an independent trailer or an independent semi-trailer (i.e. the chassis of the trailer is not common to a chassis of the tractor), which can be removeably attached to the tractor (front part) of the vehicle.

The fluid used in the hydraulic transmissions and in the conditioning circuit is preferably oil, but may be any appropriate fluid, such as a liquid or a gas, such as water or air.

Other variations and modifications of the system or the vehicle will be apparent to the skilled in the art in the context of the present disclosure.

The invention claimed is:

1. A mobile inspection system comprising:
   an inspection module mounted on a chassis of the system and comprising an inspection radiation source and an inspection radiation detector, the inspection radiation source being configured to generate at least one of x-rays, gamma rays, and neutrons;
   wherein the system is configured to operate at least in:
      a transport mode wherein the system is configured to transport the inspection module; and
      an inspection mode wherein the inspection module is configured to cause scan of an item;
   a motion generation module adapted to be connected to an engine configured to cause motion of the system at least in the transport mode; and
   a power conversion module coupled with the motion generation module, the power conversion module configured to cause conversion of energy from the engine into electrical energy for at least the inspection module, in the inspection mode,
   wherein the inspection mode comprises a scan mode, wherein the system is configured to move, with a scanning motion, with respect to the item to be scanned, and wherein the motion generation module is adapted to be connected to the engine configured to further cause motion of the system in the scan mode;
   wherein the motion generation module further comprises a mechanical drive transmission adapted to be connected to the engine and a driven axle of the system and to a reduction drive transmission; and
   wherein the motion generation module is configured to drive the driven axle through the mechanical drive transmission, when in the transport mode, and further is configured to power the power conversion module through the reduction drive transmission, when in the inspection mode.

2. The mobile inspection system according to claim 1, wherein the inspection radiation detector is adapted to be activated by a power supply adapted to be connected, in the inspection mode, to the conversion module.

3. The mobile inspection system according to claim 1, wherein the inspection radiation source comprises an X-ray generator adapted to be activated by a power supply adapted to be connected, in the inspection mode, to the conversion module.

4. The mobile inspection system according to claim 1, wherein the motion generation module further comprises a transfer case adapted to be connected to the engine and configured to switch between a transport mode when the system is in the transport mode and an inspection mode when the system is in the inspection mode, and
   wherein the transfer case is further configured to cause, in the inspection mode, the power conversion module to cause conversion of energy from the engine into electrical energy for at least the inspection module.

5. The mobile inspection system according to claim 4, further comprising a regulation module configured to regulate the speed of the system to a speed set point, in the inspection mode.

6. The mobile inspection system according to claim 4, wherein the reduction drive transmission comprises a hydraulic drive transmission comprising a hydraulic pump and a hydraulic motor.

7. The mobile inspection system according to claim 6, further comprising a regulation module configured to regulate the speed of the system to a speed set point, in the inspection mode, and wherein the hydraulic pump is a variable displacement pump, and wherein the regulation module is adapted to control the displacement of the pump, such that a speed of the motor is regulated to a set point.

8. The mobile inspection system according to claim 6, wherein the power conversion module comprises at least one of a mechanical transmission and a hydraulic transmission, for connecting the engine to an electric generator, and further comprising a conditioning circuit common to the hydraulic transmissions of the reduction drive transmission and the power conversion module.

9. The mobile inspection system according to claim 1, further comprising a regulation module configured to regulate the conversion module to a set point.

10. The mobile inspection system according to claim 1, wherein the power conversion module comprises at least one of a mechanical transmission and a hydraulic transmission for connecting the engine to an electric generator, in which at least one of the following conditions exist:
    wherein the hydraulic transmission comprises a hydraulic pump and a hydraulic motor,
    wherein the power conversion module further comprises a safety brake configured to stop a hydraulic transmission in case of hydraulic power loss in the hydraulic transmission, or
    wherein the inspection radiation detector comprises an electro-hydraulic boom, the system further comprising a conditioning circuit which is common to the electro-hydraulic boom and at least one hydraulic transmission.

11. The mobile inspection system according to claim 10, further comprising a regulation module configured to regulate the conversion module to a set point and wherein the hydraulic pump is a variable displacement pump, and wherein the regulation module is configured to control the displacement of the pump, such that a speed of the motor is regulated to a set point.

12. The mobile inspection system according to claim 1, wherein the motion generation module is further adapted to cause supply of energy to any electrical device of the system, in the inspection mode.

13. The mobile inspection system according claim 1, wherein the system does not comprise any additional power generator which is not adapted to be connected to the engine.

14. The mobile inspection system according to claim 1, wherein the inspection module and the motion generation module are mounted on the chassis of a trailer, and the engine is mounted on a tractor.

* * * * *